United States Patent [19]
Ström et al.

[11] Patent Number: 4,655,093
[45] Date of Patent: Apr. 7, 1987

[54] WEB TENSION MEASURING METHOD AND DEVICE

[75] Inventors: Valter E. Ström, Stockholm; Bo-Lennart I. Johansson, Uppsala; Hakan I. Karlsson, Akersberga; Thomas Östman, Spånga, all of Sweden

[73] Assignee: Svenska Traforskningsinstitutet, Stockholm, Sweden

[21] Appl. No.: 755,459

[22] Filed: Jul. 16, 1985

[30] Foreign Application Priority Data

Jul. 18, 1984 [SE] Sweden ................................ 8403761

[51] Int. Cl.[4] .................... G01L 5/04; G01H 13/00
[52] U.S. Cl. ................... 73/862.41; 73/DIG. 1
[58] Field of Search ............. 73/862.41, 862.07, 37.6, 73/159, DIG. 1

[56] References Cited

U.S. PATENT DOCUMENTS 4,109,520  8/1978  Eriksson ...................... 73/862.41
4,235,102 11/1980  Karlsson et al. ............. 73/862.41

FOREIGN PATENT DOCUMENTS 0538249  1/1977  U.S.S.R. ..................... 73/DIG. 1

Primary Examiner—Charles A. Ruehl
Attorney, Agent, or Firm—Burns, Doane, Swecker & Mathis

[57] ABSTRACT

Web tension measurement in that the web (5) is caused to oscillate transversely with the resonance frequency for the portion of the web (5) defined by a support (2,2a). The oscillations are measured by detectors (6,7) for determining the web tension. The measuring is carried out free of contact in that a thin air layer is maintained between the support (2,2a) and web (5).

6 Claims, 2 Drawing Figures

WEB TENSION MEASURING METHOD AND DEVICE

BACKGROUND OF THE INVENTION

This invention relates to a method and a device for measuring the web tension of paper, foils or the like.

At the making or treatment of paper, foils or the like, the material in the form of a web is drawn between conducting rollers, which deflect the web and cause it to be suspended. In this connection it is of great importance, that the tension in the web is maintained within definite limits in order to prevent web break. It is also essential to maintain the web tension at a uniform level across the web, in order to avoid the formation of wrinkles or other unfavourable effects. It is, therefore, desired to be able to measure the web tension continuously in different places along the web and also in several places in the transverse direction of the web. By measuring the web tension continuously, it can be adjusted so that the aforesaid inconveniences are prevented.

The web tension often is measured by utilizing a resonance phenomenon, which arises when the paper web is caused to oscillate transversely between two rollers. In this connection use is made of the fact that the resonance frequency of a material web has a definite relation to the tension in the material.

Devices are also known, at which an intermittent oscillation is applied to a portion of the web, and the transit time for the oscillation to reach another point on the web is indicated. This transit time has a special relation to the web tension.

This latter method involves the disadvantage of being sensitive to external interferences, such as noise. Since the method is to be used in an extremely noisy environment, noise shielding must be provided at the place of measurement. Such shielding is both troublesome and expensive.

According to another type of web tension gauge, which is disclosed in the Laid-Open Document Sweden No. 7603778-7, the web is subjected to transverse oscillations between two support places by a periodically varying force with a definite amplitude and frequency. The oscillation amplitude is measured and constitutes a measure of the web tension. The frequency of the force shall be either slightly above or below the expected basic resonance frequency of the web at the possible web tensions, i.e. the web tension, at which resonance occurs, shall be either slightly higher or slightly lower than any expected tension of the web. The measuring range then will be within a range where small variations in web tension yield great changes in amplitude. By measuring the amplitude, the web tension can be obtained by means of a calibration curve. It is, thus, necessary to carry out calibration in order to obtain a frequency yielding a suitable measuring range. If the web tension varies beyond the measuring range, the frequency must be changed and another calibration curve be utilized.

A variant of this web tension gauge, according to SE-PS No. 7802788-5, utilizes the relation between the resonance frequency and the relation between the web tension and the mass per unit area, and the phase shift between the oscillation of the web and the variations in pressure causing the web to oscillate or the signal effecting the pressure variations.

The resonance frequency is proportional to the root of the relation between web tension and mass per unit area. It is, thus, possible to obtain the web tension by a separate measurement of the mass per unit area.

The aforesaid gauges, which are based on the resonance between two supports, are designed for contacting the paper web. This restricts their use and implies high requirements on the application of the gauge. Contact causes friction against the web, and thereby the web tension is affected. Contact further causes wear and deposits of dust on the measuring head.

SUMMARY OF THE INVENTION

The present invention renders it possible to measure the web tension without contact, in that the device is designed so that a thin air layer is established between the gauge and paper web. It was found by surprise that, in spite of the absence of any contact, a resonance phenomenon yet can be obtained. The measuring head thereby can be made movable perpendicularly to the plane of the paper web, which implies that the measuring head can follow the paper web. The gauge thereby is independent of suspension on a cross-beam provided above the web, to which beam the gauge is attached or along which the gauge is movable. No special requirements on the design and stability of the cross-beam then are to be met.

BRIEF DESCRIPTION OF THE DRAWINGS

The invention is described in greater detail in the following, with reference to an embodiment illustrated in the accompanying drawing, in which.

DESCRIPTION OF PREFERRED EMBODIMENTS

Figure 1:
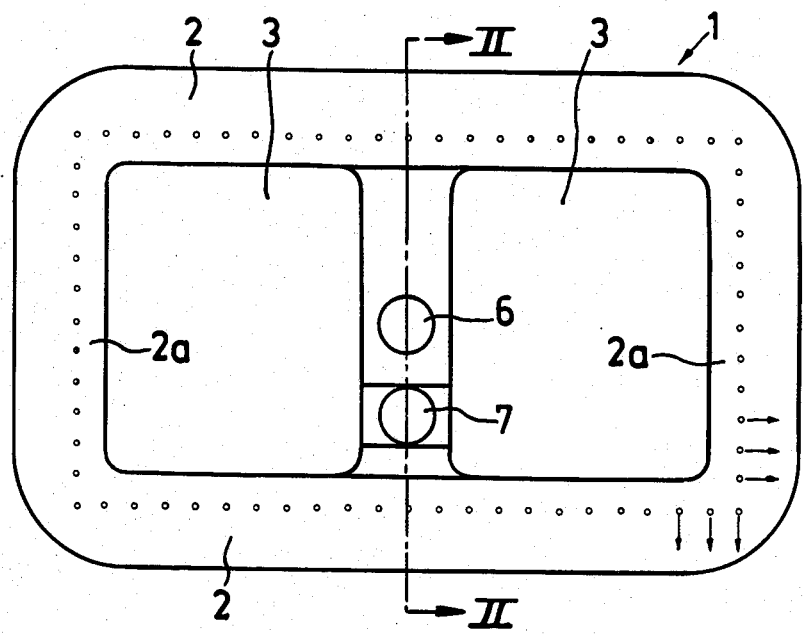
FIG. 1 is a view from below of a measuring device according to the invention.
Figure 2:
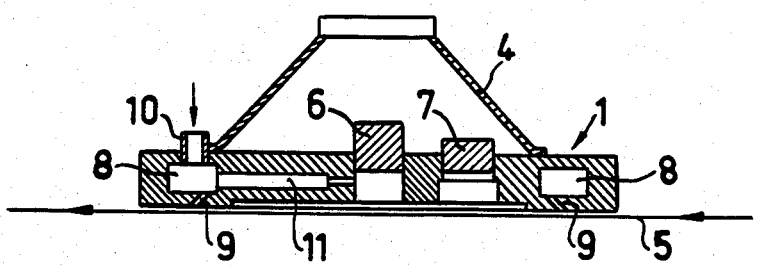
FIG. 2 is a section along II—II in FIG. 1.

The measuring device shown in the Figures comprises a measuring head 1 with a support 2,2a, by which a measuring surface 3 can be defined. The measuring surface can have different geometric configuration, for example rectangular or elliptic. The measuring surface, further, can be defined by only two parallel support members 2. Adjacent the measuring surface 3, a device, preferably a loudspeaker 4, is provided for generating periodic pressure variations. The loudspeaker causes the web 5 to oscillate transversely by means of a periodically varying sound pressure. The size of the measuring head depends on the web material. For sack paper the rectangle defined by the support 2,2a, for example, can be 5×10 cm², and the width of the support members can be 1-2 cm.

In the measuring gap a number of detectors 6,7 are located for measuring the web oscillation. The detectors 6,7 can consist of a pressure transmitter intended to measure the varying sound pressure from the loudspeaker 4, and a detector for indicating the position of the web during the oscillation. For the position detection, for example, ultrasound or optical devices can be used.

In the support 2,2a air passageways 8 are provided so that a plurality of apertures 9 are located in the lower surface of the support. Compressed air is supplied through a feed aperture 10 to the passageways 8 and permitted to flow out through the apertures 9 in order thereby to bring about a thin air layer between the support 2,2a and web 5. Air can also be directed from the passageways 8 through a lateral passageway 11 to the detectors 6,7 for maintaining the detectors clean from dirt and dust.

The arrangement of the compressed air outflow, thus, has the object to produce a certain small distance between the measuring head and web. The arrangement can be an approximation of a line source with an air passageway in the measuring head which distributes a uniform air pressure along the entire length of the support 2,2a and densely located apertures 9. The diameter of the apertures can be 0.25–1.0 mm with a centre distance of 2–10 mm, preferably about 5 mm. The apertures 9 can be directed obliquely outward from the centre of the measuring head, preferably about 45° to the normal of the web. The air pressure in the air passageway can vary within wide limits, for example 50 kPa–500 kPa.

For enabling the arrangement with air outflow to maintain a thin air layer, which can be about 0.1 mm, between the support 2,2a and web 5 across the entire surface of the support, the force, by which the support is pressed to the web shall be uniformly distributed and be not too strong. One way of achieving this can be to cause a light measuring head 1 to rest by its own weight on the web, so that the position of the measuring head in parallel with the normal of the web and the orientation (in space) of the measuring head are determined by the position and orientation of the web. The gauge then is entirely free of contact, and the friction between the support and web is eliminated. The influence of the gauge on the web tension to be measured also is reduced and at the above method can be neglected. The gauge is thereby independent of the sag of the cross-bar, to which the gauge is firmly or movably attached. The requirements on the stability of the cross-bar, thus, are very low. The mass of the measuring head 1 can be as low as about 0.1 kg. Due to the elimination of friction, no special requirements in respect of wear resistance have be be met by the material in the measuring head. The device 4 for generating periodical pressure variations need not be rigidly connnected to the measuring head 1.

The aforesaid arrangement has proved possible in that resonance vibrations could be obtained in the web in the measuring surface in spite of the absence of contact. The periodic pressure variations applied, thus, cause in the web a wave motion, which does not propagate appreciably outside the measuring surface, but gives rise to a resonance phenomenon in the measuring surface defined by the support through the support does not contact the web.

The advantages of the above arrangement have been reported above, and the arrangement, of course, can be utilized in different web tension gauges, which are based on the principle of resonance frequency, for example such as disclosed in the Laid-Out Documents Sweden Nos. 7603778-7 and 7802788-5.

It is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A device for measuring the web tension in a paper or foil web, comprising a measuring head with a support, over which the web is moved, a device located adjacent the support for generating periodic pressure variations for causing the web to oscillate transversely, and means for detecting the oscillation of the web and the periodic pressure variations applied for determining the web tension, the support provided with air passageways with a plurality of apertures for producing a thin air layer between the support and the web so that direct contact of the support on the web is prevented, the apertures directed obliquely outward from the center of the measuring head.

2. The device as defined in claim 1, wherein said apertures are directed obliquely outward at an angle approximately 45° to the normal of the web.

3. A method of measuring tension in a web, comprising the steps of:
    conveying said web along a web path;
    positioning a movable measuring head at a location along said web path, said measuring head movable in a direction substantially normal to said web path at said location, said measuring head defining a measuring space;
    spacing said movable measuring head from the web by discharging pressurized air between said measuring head and the web, whereby the discharged pressurized air prevents said measuring head from contacting the web;
    causing the web within said measuring space to oscillate transversely at said location; and
    detecting a resonance frequency of said transverse oscillation with said measuring head, whereby web tension may be determined.

4. The method as defined in claim 3, wherein said step of causing the web to oscillate transversely includes emitting periodic pressure variations from said measuring head.

5. A device for measuring tension in a web moving along a web path, device comprising:
    a measuring head at a location along the web path and movable in a direction substantially normal to said web path, said measuring head defining a measuring space;
    means for supporting said measuring head in spaced relation to the moving web at said location, said supporting means including passageways in said measuring head with apertures adapted to discharge pressurized air toward said web path; and
    means for transversely oscillating the web in the measuring space by generating periodic pressure variations at said location;
    said measuring head provided with means for detecting a resonance frequency of said transverse oscillation, whereby web tension may be determined.

6. The device as defined in claim 5 wherein said oscillating means is provided on said measuring head.

* * * * *